(12) United States Patent
Parker (10) Patent No.: US 8,174,444 B2
(45) Date of Patent: May 8, 2012

(54) METHOD OF CORRELATING KNOWN IMAGE DATA OF MOVING TRANSMITTERS WITH MEASURED RADIO SIGNALS

(75) Inventor: Michael N. Parker, Tucson, AZ (US)

(73) Assignee: Rincon Research Corporation, Tucson, AZ (US)

( * ) Notice: Subject to any disclaimer, the term of this patent is extended or adjusted under 35 U.S.C. 154(b) by 208 days.

(21) Appl. No.: 12/567,749

(22) Filed: Sep. 26, 2009

(65) Prior Publication Data

US 2011/0074631 A1    Mar. 31, 2011

(51) Int. Cl.
*G01S 3/16*    (2006.01)
*G01S 3/28*    (2006.01)

(52) U.S. Cl. ...................................................... 342/378

(58) Field of Classification Search .................. 342/450, 342/451, 454, 457, 458, 461, 463–465, 378
See application file for complete search history.

(56) References Cited

U.S. PATENT DOCUMENTS 3,795,911 A * 3/1974 Hammack ..................... 342/106
5,008,679 A * 4/1991 Effland et al. ................. 342/353
6,546,256 B1 * 4/2003 Maloney et al. ........... 455/404.2

FOREIGN PATENT DOCUMENTS

GB    2443226 A  *  4/2008

* cited by examiner

*Primary Examiner* — Harry Liu
(74) *Attorney, Agent, or Firm* — Quarles & Brady LLP (57) ABSTRACT

Systems and methods of correlating potential transmitters with received radio signals is provided. Image data is provided including paths traveled by potential transmitter. Potential transmitters are identified within the image data along with path segments traveled by potential transmitters. A first and second transmitter calculate certain parameters of received signals assuming that signals originated along the path segments. The calculated signal parameters are then compared to measured signal parameter to determine whether a transmitter is associated with a particular path.

17 Claims, 6 Drawing Sheets

METHOD OF CORRELATING KNOWN IMAGE DATA OF MOVING TRANSMITTERS WITH MEASURED RADIO SIGNALS

FIELD OF THE INVENTION

The invention relates generally to radio geolocation techniques and geographical imaging.

BACKGROUND OF THE INVENTION

Both known and novel methods exist that use multiple receivers having known locations to solve for the position of unknown transmitters, which can be both stationary and in motion. One novel method geolocating moving or fixed transmitters using time difference of arrival (TDOA) and/or frequency difference of arrival (FDOA) at multiple observing receivers is disclosed in co-pending U.S. patent application Ser. No. 11/464,762, the disclosure of which is incorporated herein in its entirety. What is common among these known and novel methods is that they attempt to solve for an unknown transmitter location or path based on signals received at known locations. Disclosed herein is the use of similar principles to solve a somewhat related problem, to wit, assuming that a plurality of potential transmitter paths are known, analyzing signals received by observers at known locations to determine whether something is transmitting along one of the known paths.

Numerous conventional techniques exist to perform to perform conventional geolocation based on various physical properties of transmission signals. It is helpful to examine some of the properties of signals that may be measured as background to determine which techniques may be borrowed to solve the problems to which embodiments of the instant invention are directed. For example, multiple receivers receiving from a single transmitter can detect differences in the angle-of-arrival (AOA) or phase-of-arrival (POA) of the received signal. In the event that one or more of the receivers is moving, the receivers can also detect differences in the frequency-of-arrival (FOA), or in some instances use receiver motion to synthesize an aperture. These parameters as well as TDOA may be used to detect the transmitter's position.

It is useful to examine the properties of narrow-band signals from unknown transmitters and what information can be measured by receivers by conventional methods.

A first quantity of interest is time of arrival or TOA. It is common to consider the TOA of a narrowband signal's modulation envelope separately from the signal's carrier phase, even though these two parameters are related. In a uniform propagation medium the TOA of a received signal is given by:

$$TOA = TOT + Range/Vg, \text{ where}$$

TOA is the time of arrival;
TOT is the time of transmission
Range is the distance between the receiver and transmitter; and
Vg is the group velocity or velocity of the modulation envelope.

A next quantity of interest is phase of arrival or POA. The phase of arrival (POA) of the received signal is given by:

$$POA = POT - (Fcarrier * Range/Vp) + K, \text{ where}$$

POT is the phase of the signal at transmission in cycles (or fractions of cycles)
Fcarrier is the carrier frequency
Range is the distance between the receiver and transmitter;
Vp is the phase velocity, which is the velocity of the carrier wave; and
K is a constant representing phase biases in the system.

Unfortunately, when the task is to locate an unknown transmitter, the transmitted waveform may be unknown, and what is more, may not a simple waveform, i.e., may not include a simple sinusoidal carrier waveform of a single frequency. In such cases, the carrier waveform may be thought of as any Fourier component of the transmitted signal that is selected for measurement. Additionally, or alternatively, narrowband filtering of the measured signal may be used to isolate a single frequency component of the received signal.

Additionally, it is important to note that the group and phase velocities of a signal may not always be equal. In a dispersive medium, where the propagation speed varies with frequency, group and phase velocities may be unequal. While group velocity must always be slower than the speed of light in vacuum, phase velocity can actually exceed the speed of light. In the ionosphere, for example, phase velocity is faster than the speed of light by the same amount as group velocity is slower than the speed of light. For the purposes of this Detailed Description, however, group and phase velocities will be assumed to be equal to one another and to c, the speed of light in vacuum.

Frequency is the rate of change of phase. The phase measured at a receiver may also change if the receiver or transmitter are moving. Frequency is conventionally measured in terms of cycles per unit time or hertz. If the path length between the receiver and the transmitter is changing over time, the received carrier frequency will be Doppler shifted by an amount equal to the negative rate of change of the length of the path from the transmitter to the receiver measured in wavelengths. The Doppler shifted frequency is given by:

$$Fd = -Vr/\lambda, \text{ where}$$

Fd is the Doppler shift in frequency;
Vr is the radial velocity or the rate of change of the path length between receiver and transmitter; and
$\lambda$ is the wavelength of the carrier.

Another parameter of interest in locating signals using TDOA is the group delay, which is the delay of the modulation envelope of a received signal with respect to a reference time. This quantity is given by $$\text{Group Delay} = -d\Phi/df, \text{ where}$$

$\Phi$ is the phase of a frequency component of a signal; and
$d\Phi/df$ is the derivative of phase with respect to frequency.

This relationship between group delay and phase as a function of frequency is useful when measuring a signal's group delay using cross spectral analysis since the amount of the group delay misalignment is inversely proportional to the cross-spectrum's phase slope with respect to frequency.

A next quantity of interest is frequency of arrival or FOA. The frequency of an arriving signal is the frequency of the carrier of the signal minus any Doppler shift, which is given by:

$$FOA = Fc - Vr/\lambda, \text{ where}$$

Fc is the carrier frequency;
Vr is the rate of change along the path between receiver and transmitter; and
$\lambda$ is the wavelength of the received signal.

In certain situations the carrier Fc may be unknown, and may drift with time due to transmitter oscillator instability.

A next quantity of interest is angle of arrival or AOA. Measuring the angle of arrival of an incoming signal can be accomplished by two or more phased antenna elements located at a known distance and orientation from one another to measure the differential phase of a signal between the elements. Alternatively, if assumptions are made about transmitter carrier stability (i.e., if it is assumed that the transmitter carrier does not experience random phase changes), moving antenna elements can be used to synthesize an antenna beam by measuring the phase front of an incoming signal with a moving element or elements.

A next quantity of interest is time difference of arrival or TDOA. As is sort forth above, the time of a signal's transmission (TOT) is generally not known, except in special cases. Accordingly, it is common to measure the TDOA at two separated receivers to eliminate the unknown TOT. This is accomplished according to the following.

$$TOA1=TOT+Range1/Vg$$

$$TOA2=TOT+Range2/Vg$$

$$TDOA=TOA1-TOA2=(Range1-Range2)/Vg, \text{ where}$$

TOA1 is the time of arrival at receiver 1

Range1 is the distance between receiver 1 and the transmitter

TOA2 is the time of arrival at receiver 2; and

Range2 is the distance between receiver 2 and the transmitter.

Measuring TDOA with two fixed receivers having known locations defines a hyperbolic surface on which the transmitter must lie, with the two receivers located at the two foci of the hyperboloid.

A next quantity of interest is frequency difference of arrival or FDOA. Generally, the frequency of the transmitter's carrier is unknown, but this unknown quantity can be eliminated by measuring FDOA between two observers, one of which is moving. If one receiver is fixed at a known location and the other is moving along a known path, measuring the FDOA determines a cone with a half-angle about the moving receiver's velocity vector. The location of a stationary transmitter must lie on the surface of this cone. The surface of the cone is determined by solving the following Doppler shift equation for the angle $$FDOA=-(V/\lambda)\cos(\Psi), \text{ where}$$

V is the magnitude of the moving receiver's velocity;

$\lambda$ is the measured wavelength of the carrier at the receiver, and $\Psi$ is the angle of the transmitter relative to the moving receiver's velocity vector.

This simplified relationship assumes one stationary and one moving receiver. The more general case of two moving receivers results in a more complicated surface on which the transmitter must lie, but solving for this more complicated surface is still possible.

Conventionally, the physical properties and relationships set forth above were applied for determining the location of a transmitter over time. Take, for example, the unknown location of a emergency locator beacon from a downed aircraft or, more generally, an emergency position indicating radio beacon. A moving receiver, for example, a satellite, would measure a received frequency versus time. Since the unknown transmitter is assumed to be on the surface of the earth, one unknown dimension in the problem is already solved for, and accordingly, one only needs to determine two additional geometrical unknowns: latitude and longitude. Unfortunately, the transmitter's transmission frequency is generally unknown, for example, because of manufacturing tolerances. Additionally, the frequency of the transmitter may drift over time. Accordingly, transmission frequency and the extent of transmitter frequency drift must be estimated. This compli-cates the problem, moving the number of unknowns from 2, x and y position, to 3 to 4 unknowns.

In order to solve a set of equations, one must have at least as many independent equations reflecting measurements of known parameters as unknown variables. The conventional practice is to measure as many of the quantities discussed above as possible resulting in an over-determined data set, and then to use some numerical method to iteratively adjust potential values of the unknown parameters to minimize the residual errors between actual measurements and the modeled data. Such numerical methods of solving non-linear equations are conventionally known in the art.

Similar principles to the emergency locator beacon apply if the positions of the transmitter and receiver are reversed. For example, if one receiver is located on a vehicle at the earth's surface and the transmitter is located in orbit, for example, the Doppler equations are similar to those found in the emergency locator beacon problem. This is because the geometry is identical, which allows the same simplifying assumptions, but the propagation direction of the signal is reversed. This was the situation faced in establishing the U.S. Navy's Transit satellite navigation system for ship location. This problem was complicated by the fact that ship motion introduced additional unknown parameters, i.e., the ship's course and speed, which affected the Doppler measurements. However, ship motion could be determined locally, e.g., by reading a magnetic heading and measuring speed through the water. Additionally, ship speed was generally much slower than the speed of the satellite across the sky, which allowed for further simplifying assumptions.

In considering the methods used to solve for unknown parameters in TDOA and FDOA space it is useful to set forth the difference between resolution and estimation. It is known that measurements such as TDOA and FDOA have a fundamental resolution limit, which are approximately 1/bandwidth of the receiver for TDOA and 1/(observation time) for FDOA. There are methods, however, of estimating the actual values of measured parameters within these resolution limits. For example, if there are two receivers and a single strong target signal, cross correlation can be performed between the two receivers to estimate signal parameters more accurately than fundamental resolution limits would otherwise allow. Additionally, there are "super resolution" techniques, which are typically applied to AOA measurements, that allow for several signals to be present within the same resolution cell (that is where several signal parameters can not normally be resolved within the resolution limit) and still be individually estimated more accurately than the size of the resolution cell.

Conventional methods of TDOA/FDOA based geolocation generally require that unknown parameters be located in TDOA and/or FDOA space to solve for a transmitter's location. One way of measuring unknown parameters is to start with a representation of an ideal waveform and modify it's parameters such as TOA, FOA, etc. until the resulting modified waveform matches the observed waveform. Multiplying the observed waveform by the complex conjugate of the modified waveform forms a "matched filter". If the observed signal is matched to the modified waveform, a larger averaged multiplication product results than if the waveform doesn't match. This process allows for an iterative convergence to the transmitted waveform based on evaluating and discarding estimates of the waveform.

An early application of such matched filtering was detecting modulated radar pulses buried in noise. Pulse compression was achieved by matching the received signal with the transmitted signal modified in delay and Doppler. Often a search was performed over delay-Doppler space with many different matched filters designed with slightly different delay and Doppler parameters. A 2-dimensional surface with axis of delay and Doppler could be generated with the height of the surface determined by the magnitude of the filters' output. Periodicities or other features of the signal modulation sometimes resulted in strong responses at other delay-Doppler values than the correct one. Because these responses resulted in ambiguous potential locations derived from the radar, the delay-Doppler response became known as the ambiguity function.

In a like manner, the cross-correlation between two receivers could produce an ambiguous result in TDOA-FDOA space. Accordingly, the result of cross-correlating waveforms from two receivers with different offsets in TDOA and FDOA became known as the cross-ambiguity function or CAF. Computation of the cross-ambiguity function generally requires electronic hardware or software, however, there is nothing in principle that dictates that a cross-ambiguity function must be computed with either analog or digital hardware. However the trend has been from analog to digital as technology evolves. Early methods of solving the ambiguity function involved "brute force" computational approaches where each delay and Doppler point in the ambiguity function is calculated by shifting the two waveforms in delay and Doppler, multiplying them, and integrating to form an estimate of the cross-correlation value at the corresponding delay and Doppler.

As an alternative to "brute force" fast Fourier transform ("FFT") methods were developed to accelerate FDOA processing. An early observation with the "brute force" method set forth above was that one could increase integration time and simultaneously search many Doppler bins by using a FFT applied to the complex product of the correlator output. A typical situation might be searching a kilohertz range in FDOA with 1 Hz resolution produced by coherent integration of 1 second. The solution was to start with an integration time T on the order of a millisecond. An integration of 1 millisecond with no windowing results in a sin(x)/x type frequency response with nulls at +/−1 kHz.

The complex cross-correlation estimates at each lag value were input as a complex time sequence to a computer, appropriately windowed and FFTed. For example, with N=1024 and T=1 millisecond (1 kHz data rate), 1,024 frequency bins with a width of about 1 Hz and spaced about 1 Hz result.

Even if the FDOA was changing with time, it was possible to apply a "dechirp" to one of the correlator legs and then increase the integration. If N=64K in the above example, then Doppler resolution and spacing can be reduced to about 0.015 Hz while coherent integration can be increased to over a minute.

Eventually digital filters began using FFTs instead of "brute force" tapped delay lines and multipliers to implement filters. The same concepts enable cross-correlation to be performed more efficiently using FFTs.

One example of this technology was a transmultiplexer. A transmultiplexer forms a bank of adjacent narrowband filters. So, for example, a transmultiplexer with an input data rate of 10M complex samples per second using FFTs of 8,192 points will have channels spaced 1.2 kHz apart and resolution of roughly the same.

Such channels have impulse response duration on the order of 1/Bandwidth or about a millisecond. The cross-spectrum between two such channels can be computed by multiplying and integrating (with a complex conjugate inserted) two such channel banks on a channel-by-channel basis.

In the transmultiplexer method, the problem of not knowing the signal-bandwidth and frequency in advance is largely solved. The channel bank separates signals that lack complete frequency overlap. For signals that overlap in frequency but are separated in FDOA, the signals can still end up being resolved.

The complex cross-spectrum of a particular frequency bin will have a phase that changes slowly with time if the signal component in that bin is near the geolocation corresponding to the bulk TDOA and FDOA. A slowly varying phase with time indicates a slight FDOA mismatch which, in turn, indicates that the energy is located at a slightly different location than corresponding to the bulk FDOA. The sample rate out of each filter is slow, corresponding to the Nyquist frequency of a narrowband filter. In order to accommodate signals that are slightly offset from the bulk FDOA setting, the complex cross-spectral output of each channel can be subject to an additional FFT of N samples in the same manner as described above. In this manner, long-duration coherent integration with resulting fine FDOA resolution can be performed.

Different frequency bins across the processing band that contain energy from the same transmitter will have similar FDOAs. Software then forms clusters in FDOA and associates energy from within an FDOA cluster together. In this manner, the frequency, bandwidth, and spectral shape of associated signal energy is determined. An important detail is that the FDOA of different frequency bins will be slightly different due to the fact that at a fixed range rate the FDOA magnitude of higher frequency energy will be proportionately larger than the FDOA magnitude of lower frequency energy.

Once energy from multiple frequency bins is associated with one transmitter, the phase slope vs. frequency of energy from these bins can be computed. This phase slope vs. frequency is the precise TDOA offset of that signal from the bulk TDOA setting.

A background in the basic problems involved with geolocation has been provided. It has been shown that one method for geolocation requires a solution for unknown parameters in TDOA and FDOA parameter space, and that several conventional methods exist for providing this solution. The basic problem to be solved by conventional methods is to locate the unknown position of a transmitter on the basis of measurements of received signals by one or more receivers.

Known methods exist for locating cooperative transmitters, i.e., transmitters for which information about the transmission is known in advance. Locating non-cooperative transmitters, i.e., transmitters transmitting arbitrary signals, is an important and more difficult problem. Additionally, while, measurements of FOA, TOA, TDOA, FDOA, and AOA are commonly used in various combinations to located fixed transmitters, there are few easy methods for locating moving transmitters. This is because moving transmitters introduce additional Doppler shifts that are difficult to distinguish when performing FDOA measurements using moving receivers.

A significant problem, indeed perhaps the most significant problem, in locating moving transmitters is determining their path, or their velocity over time. It has long been known that if the velocity vector of a transmitter were known, one could compensate for the motion and make a new mapping of TDOA/FDOA into geolocation. A common approach to locating a moving transmitter is to attempt to model the transmitter motion and then estimate the unknown model parameters by making more measurements than model unknowns. For example, one might assume that course and speed are constant over the observation interval. Then only 4 unknown parameters must be estimated; latitude, longitude, course, and speed. If this assumption is valid, then good results might be obtained. Otherwise, one can hope that an inconsistency in data residuals would suggest that the assumption was invalid. With many changes in course and speed, however, as might be present in a land vehicle, this approach fails.

What is needed, and what is disclosed in the detailed description below, is a method and system that allows for detection of transmissions from moving transmitters emitting arbitrary signals, where the moving transmitters can experience frequent path changes.

SUMMARY OF THE INVENTION

The present invention is directed to a method and system for identifying a source of signals on the basis of measured signal information and geographical image data of potential transmitter sources. In contrast to conventional geolocation, instead of attempting to geolocate a vehicle and then finding it in an image, systems and methods according to the invention find vehicles in an image and then associate radio signals with the vehicles. Alternatively, a vehicle in an image may be selected and all radio energy transmitted by that vehicle identified.

At their highest level, embodiments of the invention start with an image of an area of interest. Potential moving transmitters are located within the image, e.g., a plurality of vehicles that may be transmitting signals of interest. From the image data, the vehicle paths are determined and decomposed into segments. This results in vehicle path segments which, fundamentally, are data sets showing vehicle position as a function of time and vehicle velocity as a function of time. The locations, and if applicable, the velocities of one or more receivers are known with respect to some reference position in the image. Accordingly, the locations, and if applicable, the velocities of one or more receivers are known with respect to each of the transmitter path segments. The FDOA and TDOA of potential or hypothetical signals transmitted from the potential transmitters at each of the transmitter path segments is then calculated as a function of time. That is to say, if one knows how the potential transmitters are moving with respect to the receivers, if the potential transmitter is transmitting a signal, one can determine, with some level of uncertainty, the FDOA and TDOA that the receivers will measure as a function of time from that signal. This hypothetical FDOA and TDOA data are then compared with actual FDOA and TDOA signals measured by the transmitters over time. The hypothetical FDOA and TDOA calculations are then compared to the measured FDOA and TDOA data to determine whether a particular potential transmitter is the source of signals received by the transmitters. This process can be repeated for any potential transmitter in a scene of image data.

In one embodiment a method of correlating potential transmitters with received radio signals is provided. The method involves providing image data including paths traveled by potential transmitters, identifying potential transmitters within the image data and identifying path segments traveled by the potential transmitters. The method further involves, providing at least a first and second receiver of radio signals and calculating at least one of the following parameters: time difference of arrival, phase difference of arrival and frequency difference of arrival, of radio signals broadcast from the identified path segments to the first and the second receivers. Additionally, the method involves receiving radio signals from potential transmitters at the first and second receivers; measuring time difference of arrival, phase difference of arrival or frequency difference of arrival, for the received radio signals, comparing the at least one measured parameter with the at least one calculated parameter, and associating received radio signals with identified path segments on the basis of said comparison.

In one embodiment, the calculating step includes calculating time difference of arrival and frequency difference of arrival of radio signals broadcast from the identified path segments to the first and the second receivers. In another embodiment, the measuring step includes measuring time difference of arrival and frequency difference of arrival of the received radio signals.

In one embodiment, the comparing step comprises establishing discrete filters with delay and phase versus time characteristics for each of said identified path segments, and applying the discrete filters to the calculated time difference of arrival and frequency difference of arrival for said received radio signals.

In one embodiment discrete filters are established by providing a first input signal from said first receiver of radio signals, providing a second input signal from said second receiver of radio signals, and applying a time delay to said first input signal on the basis of a calculated time difference of arrival of radio signals broadcast from the identified path segments to the first and the second receivers. Then a frequency offset is applied to the first input signal on the basis of a calculated frequency difference of arrival of radio signals broadcast from the identified path segments to the first and second radio receivers. The complex conjugate of the second input is taken. Complex multiplication is then performed between the complex conjugate of the second input signal and the time delayed and frequency offset first input signal. The signal resulting from the complex multiplication is then integrated over time.

In one embodiment comparing the measured parameter with the calculated parameter includes generating a plot of calculated time difference of arrival and frequency difference of arrival for candidate transmitters in FDOA/TDOA space, generating a plot of measured time difference of arrival and frequency difference of arrival in FDOA/TDOA space, and overlaying the plot of calculated FDOA and TDOA and said plot of measured FDOA and TDOA.

In certain embodiments one of the first or second receivers is in motion, while in another embodiment, both receivers are in motion.

One embodiment of the invention includes a method of associating received radio signals with potential transmitters. The method comprises, providing image data showing candidate transmitters, identifying candidate transmitters, selecting a first candidate transmitter, and measuring the selected first candidate transmitter's trajectory segments. The method also provides, at least two receivers having known paths resulting in a first received signal and a second received signal. One of the following parameters is calculated based on the measured trajectory of the first candidate transmitter: time difference of arrival, frequency difference of arrival, or phase difference of arrival. A time shift is applied the first received signal resulting in a time-shifted signal. The second received signal is cross correlated with the time shifted signal. The resulting function is integrated over time.

In one embodiment, the time shift applied to the first received signal is calculated on the basis of a measurement of time difference of arrival at said first and second receivers. In one embodiment, the frequency offset applied to the first received signal is calculated on the basis of a measurement of frequency difference of arrival at said first and second receivers. In one embodiment, a least one of said first and second receivers is in motion. In one embodiment, a second candidate transmitter is selected.

In one embodiment, a method of identifying a source of signals is provided. The method involves providing image data showing a plurality of candidate transmitters, providing a first receiver adapted to receive radio signals from said plurality of candidate transmitters, and calculating a Doppler shift as a function of time for received radio signals for each of said plurality of candidate transmitters. The calculated Doppler shift is compared with received signals having known frequency characteristics.

In once embodiment, a system for correlating measured radio signals with potential transmitters is provided. The system provides a first radio receiver having a first input, a second radio receiver having a second input, and a delay element in communication with said first input. A first computational element is coupled to said second input adapted to provide a complex conjugate of a signal on said second input. A second computational element is coupled between said first and second inputs adapted to complex multiply a time-shifted signal on said first input and a complex conjugate of a signal on said second input.

In one embodiment, a frequency offset element coupled to said first input. One embodiment provides a third computational element adapted to complex multiply a time-shifted signal with a frequency offset. Another embodiment provides a fourth computational element adapted to integrate over time a cross-correlated signal resulting from said second computation element.

Embodiments of the invention have a number of advantages.

In embodiments of the invention, precise geolocation is achieved primarily by the imaging system, not the radio system. Once the paths or tracks of all moving vehicles in a scene are known, the imagery is often the best source of precision position measurements. Then the problem becomes one of associating a received signal with a particular moving vehicle.

In certain embodiments, it is possible to associate vehicles with signals without performing a full geolocation solution of the radio signals. This means that the number of radio collectors can be as few as one or two in some situations.

In certain embodiments, long-duration coherent integration can be performed in order to bring weak signals out of the noise or to simultaneously resolve and measure multiple co-channel interfering signals.

Certain embodiments allow for radio transmissions to assist associating image track segments with moving transmitters despite momentary breaks in image visibility of the moving transmitter. In other words, in certain embodiments, the measured radio data can be used to fill in information gaps about vehicle position in the image data if the image data becomes discontinuous. In other embodiments, vehicles that cease transmitting may be followed by continuing to image them.

In some embodiments, factors that identify either vehicles or radio signals can be used to pick up and bridge tracks separated in time. For example, a vehicle's tag number might be used to associate multiple passengers using different cell phones with a particular vehicle. Alternatively, a specific radio set might be associated with multiple vehicles or locations.

DETAILED DESCRIPTION OF THE INVENTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Figure 1:
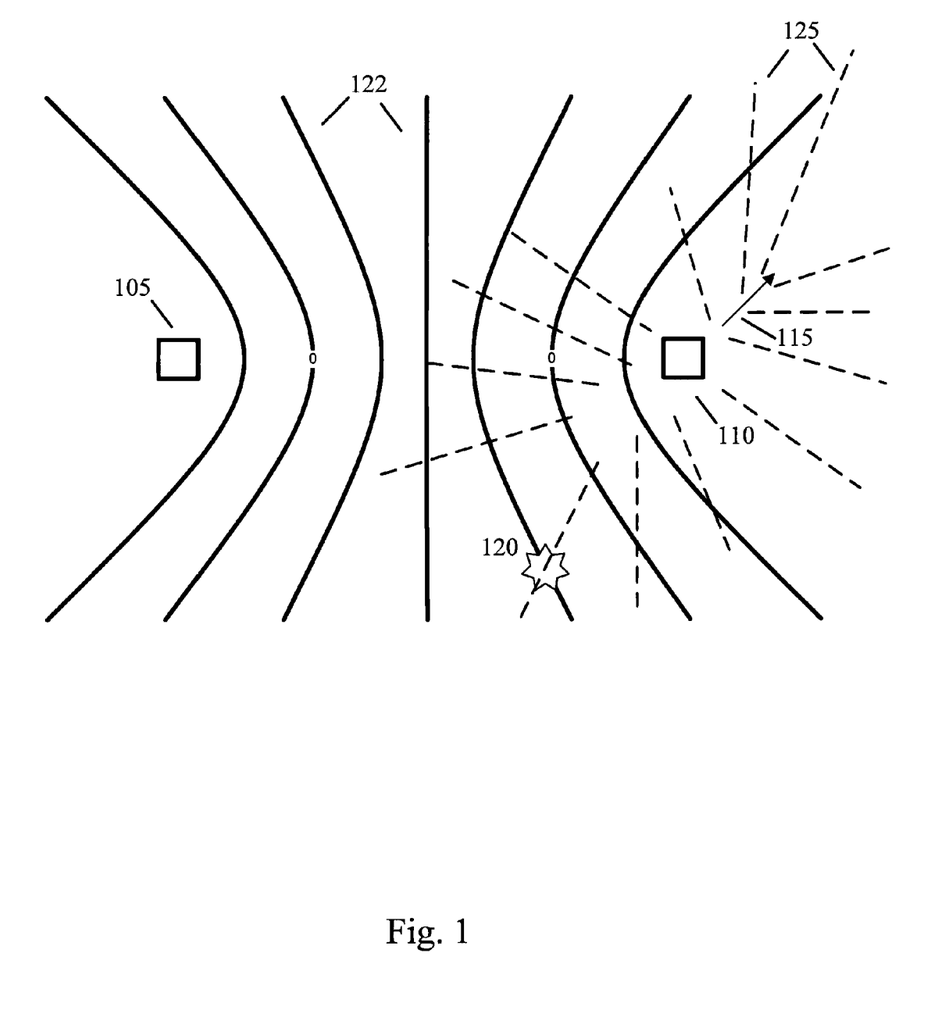
FIG. 1 is a drawing of a slice of three dimensional space showing contours of constant FDOA and TDOA for an unknown transmitter being monitored according to an embodiment of the invention.

FIG. 1 shows a planar slice of 3-D location space (i.e., space defined in x, y, and z positional coordinates) in which is located an transmitter of unknown fixed position and two receivers, 105 and 110. The planar slice of FIG. 1 may represent the plane of the earth's surface with receivers 105 and 110 being located on the earth's surface. Receiver 110 is in motion, denoted by velocity vector 115, while receiver 105 is fixed. A transmitter 120 is at a fixed location somewhere in x, y, z space. Measurement of TDOA between receivers 105 and 110 yields a plurality of hyperboloidal surfaces representing contours of constant TDOA. Solid lines 122 represent intersections of these hyperboloidal surfaces with the surface of the earth. Receivers 105 and 110 are located at the foci of these hyperboloids. The position fix by TDOA selects a single hyperboloidal shell corresponding to the measured TDOA A plurality of FDOA measurements between receiver 105 and moving receiver 110 yields a plurality of conical surfaces on which a fixed transmitter can lie defined about moving receiver 110's velocity vector 115. Dashed lines 125 represent intersections of this family of cones with the surface of the earth. The position fix by FDOA selects a single conical surface from this family of conical surfaces. In the case of FIG. 1, the signal is shown to have a negative FDOA, so the transmitter falls somewhere on the dotted line behind the moving receiver.

Although a fixed transmitter 120 obviously occupies only one position in 3-D space, when 3-D space is mapped to TDOA-FDOA space, multiple potential transmitter locations can exist within a single TDOA-FDOA resolution cell. In 3-D space the solution is constrained to the curve defined by the intersection of one of the FDOA cones with a TDOA hyperboloid. If the transmitter is known to be located on the earth's surface, the points where this curve intersects the earth's surface constrain the possible transmitter locations.

In one improved method of geolocation in the situation of FIG. 1, long-duration integration is performed to form images with resolution good enough to separate closely spaced transmitters. This method is set forth in more detail below.

As a receiver, for example moving receiver 110 in FIG. 1, moves past transmitter 120, the velocity component of the receiver in the direction of the transmitter changes. With a constant difference between the two velocity components toward the two receivers, range difference or phase difference between the two receivers is changing at a constant rate. So the phase vs. time slope is linear and the FDOA, which is proportional to the negative of this slope, is constant. In the TDOA-FDOA ambiguity plane all the energy from a transmitter bunches up at one spot in FDOA.

However as the differential velocity changes the phase difference vs. time changes and the FDOA changes. It is convenient to fit the range difference vs. time with a polynomial and consider higher order terms one at a time. The first non-constant term is parabolic in phase or linear in FDOA (a straight-line chirp in FDOA). For a specific location on the surface and receiver motion, this term can be simply calculated. With one receiver fixed and the other moving, it has a simple interpretation. Generally, the farther the transmitter is from the receiver, the slower the FDOA chirp.

In order to increase integration time in the TDOA-FDOA ambiguity plane, one must apply a quadratic phase vs. time correction, or FDOA chirp, to the output of a TDOA-FDOA ambiguity cell. This correction, allows the FDOA component of the resolution cell to be split into many more highly-resolved FDOA bins.

If there is uncertainty about the motions involved, one approach is to form a 3-dimensional ambiguity function with chirp rate, or acceleration, as the third unknown dimension. This approach can be extended to a 4th or more dimension. For example, one can add a 4th dimension by adding jerk (the $3^{rd}$ order phase term or quadratic curvature in FDOA) as a dimension of parameter space to be processed.

This process can become untenable with known, but complex receiver motions. Complex motion is often experienced by receivers on an aircraft. In one embodiment, a solution is provided by performing the processing using the physical world's coordinate system rather than performing the processing in TDOA/FDOA space.

When dealing with complicated receiver motions, it is often easier to numerically compute range vs. time from a point on the earth's surface to the receivers. This allows direct compensation for variable motion of receivers on aircraft due to turbulence, maneuvers, etc. It also has the beneficial effect of providing compensation for higher-order phase polynomial terms due to large angular changes of a receiver as it flies by a transmitter.

Figure 2:
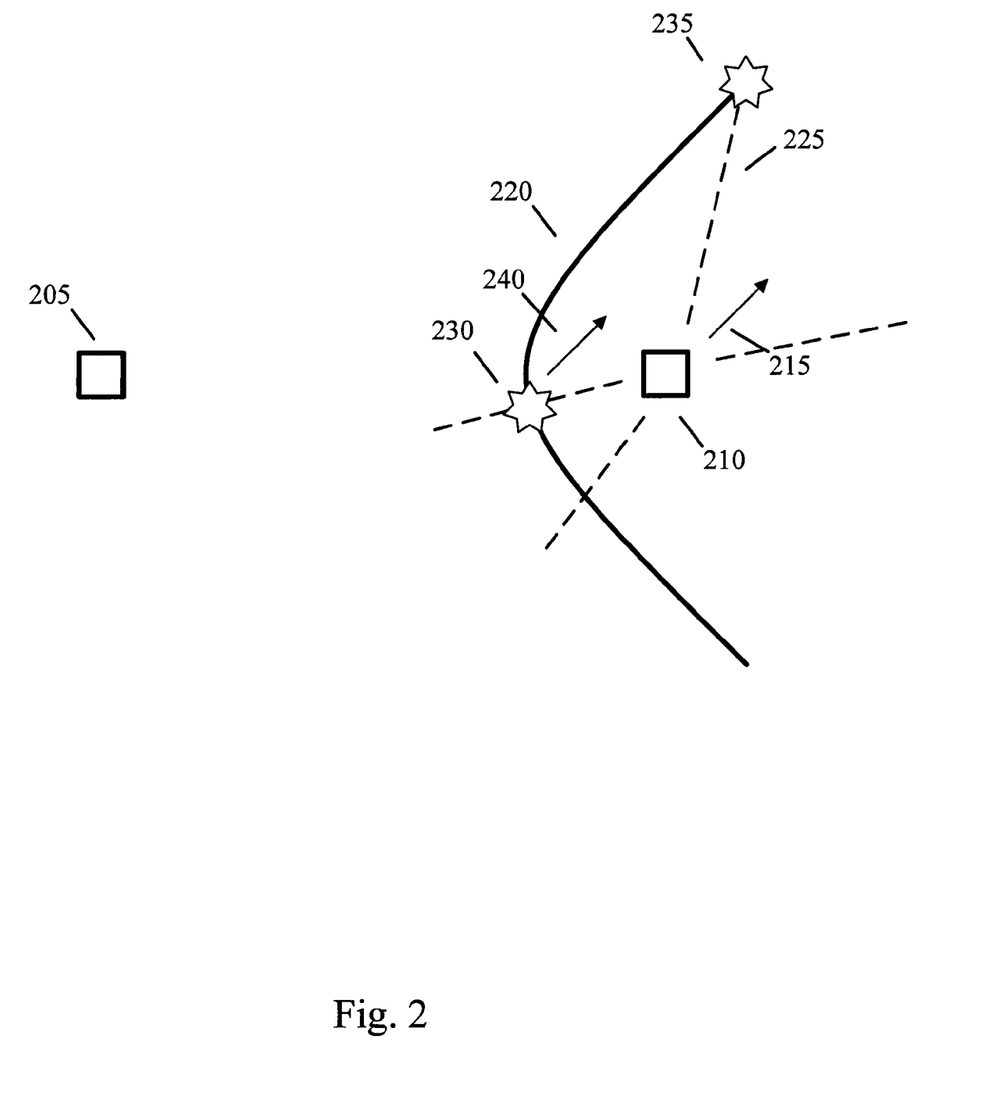
FIG. 2 is a drawing of a slice of three dimensional space showing contours of constant FDOA and TDOA for a moving transmitter being monitored according to an embodiment of the invention.

The situation of FIG. 1 becomes more complicated when the transmitter is moving, since transmitter motion shifts the apparent position of the transmitter given by FDOA. FIG. 2 shows a planar slice of 3-D location space (i.e., space defined in x, y, and z positional coordinates) in which is located a moving transmitter of unknown position and two receivers, 205 and 210. Receiver 210 is in motion along velocity vector 215. TDOA measurements between receivers 205 and 210 for a fixed unknown transmitter result in a contour of constant TDOA 220 which lies in the surface of a hyperboloid having the receiver locations as foci. FDOA measurements between receivers 205 and 210 for an unknown moving transmitter 230 can result in an erroneous contour of constant FDOA 225 if the transmitter is assumed to be fixed. This contour lies in the surface of a cone centered on velocity vector 215.

If the transmitter is stationary, or if the system assumes that the transmitter is stationary, the computed position of the transmitter 230 may lie on the intersection of one of the contours of constant TDOA and one of the contours of constant FDOA. If the transmitter is moving, however, for example along velocity vector 240, an additional Doppler shift is introduced and the transmitter appears at position 235, when in fact it located, at least at one point of time, at position 230.

Methods and systems according to the invention accurately determine the position of a transmitter moving in an arbitrary path by determining the transmitter's position and velocity by other means. Hereinafter, any system that results in position and velocity information for a potential transmitter, e.g., a vehicle with a radio, will be referred to as an imaging system. One example might be real-time overhead imagery provided by a satellite, stationary ground-based camera or unmanned aerial vehicle, however these examples are not intended to be limiting. Any means that provides position and velocity data independent of the radio transmissions being monitored are acceptable. Examples of such non-imaging systems might include radar, lidar, or any stream of data showing a vehicles path over time, generated by, for example, a tracking device attached to a vehicle, in-ground sensors, or a stream of images or data from stationary cameras each having limited fields of view but together providing a comprehensive view of a vehicle's path of travel.

In the field-of-view of the imaging system, many moving vehicles may be present and processed to form vehicle tracks (vectors of position and velocity vs. time). In some cases, views of individual vehicles may be occasionally obscured causing track segmentation which must be stitched together.

At the same time, multiple radio signals may be present. As an illustration, consider the problem of tracking a single cell phone in a city. A pair of receivers will be receiving multiple mobile phone signals on the same frequency simultaneously, however, the individual cell phone of interest may only transmitting for a minute or less.

Embodiments of the invention allow for the examination of all vehicles seen by an imaging system to determine if any single radio transmission originated from any of the vehicles seen in the image data. Alternatively or additionally, embodiments of the invention allow for determination of whether a single radio transmission of interest came from a particular vehicle.

Figure 3A:
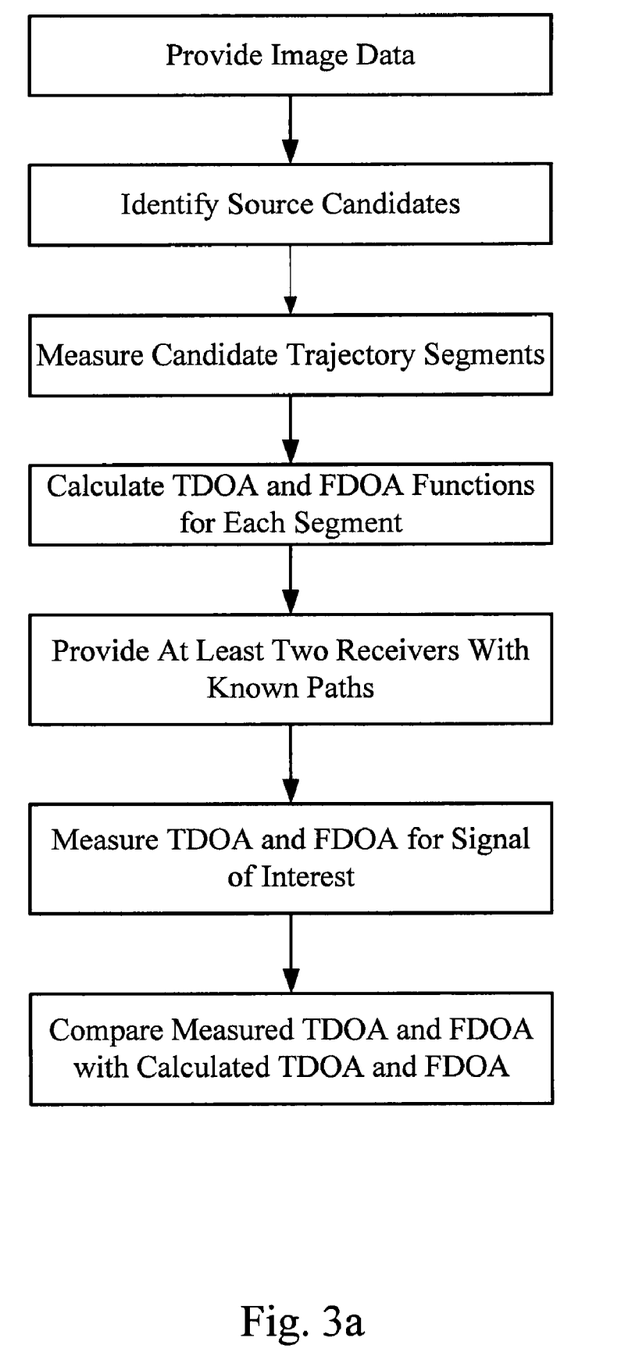
FIG. 3a is a flowchart showing a method of correlating known image data of moving transmitters with measured radio signals according to an embodiment of the invention.

FIG. 3a is a flowchart illustrating a method according to an embodiment of the invention. Initially, image data is provided. The image data may be, for example, time varying overhead image data showing a plurality of vehicles moving through a city. The image data is examined for source candidates, e.g., vehicles that may be the source of signals of interest. Candidate trajectory segments are identified, i.e., velocity vs. time and position vs. time for the source candidates is determined from the image data. By observing the imagery vs. time a finite number of candidate trajectory segments is determined. For each segment, TDOA and FDOA between at least two receivers is calculated. This is possible because the locations (or if applicable the motion paths) of the receivers is known. Accordingly, the range of each receiver to every source candidate for every position along the source candidate's path is known. Additionally, since the velocity v. time for every source candidate has been determined from the image data, the Doppler shift as a function of time can be determined, and so the FDOA between the receivers for every candidate trajectory segment can be computed.

At least two receivers are provided having known paths. Because the paths of the receivers are known, calculating the FDOA and TDOA over time that will occur at the receivers from signals originating along the paths of candidate transmitters in the image data is possible. The receivers receive radio signals, and from the received signals, FDOA and TDOA for signals of interest are determined. The measured FDOA and TDOA are then compared with the calculated FDOA and TDOA that was computed from the path segments in the image. This allows measured signals to be correlated to specific candidate transmitters.

There are a variety of methods that can be used to compare the calculated TDOA/FDOA data with the TDOA/FDOA measurements. A simple method of performing this comparison is to simply collapse measured TDOA and FDOA versus time into a single 2-D amplitude raster plot in FDOA versus time space. This results in a 2-D raster plot showing measured energy from one or more transmitters revealing FDOA changes with time. The calculated FDOA versus time of various imaged objects can then be overlaid onto this display and the calculated trajectories matched with the observed raster plot.

The challenge addressed by embodiments of the invention is determining which signals the receivers are observing when performing TDOA and FDOA measurements. In a real-world environment, the receivers will be continuously receiving an amalgam of signals of varying frequencies from a variety of transmitters. The FOA and TOA of a particular signal from a particular transmitter will be different at each receiver, and the signal of interest will be buried amidst signals from other transmitters. In order to correlate a particular measured signal with a particular potential transmitter from the image data, a method must be employed to isolate the particular measured signal.

At a high level, embodiments of the invention accomplish this task by first identifying a candidate transmitter or potential transmitter in image data, i.e., a vehicle. Next, the transmitter path is determined and broken into time varying segments from which are determined the transmitters position and location versus time. Next, on the basis of the potential transmitter's position and location versus time, the hypothetical TDOA and FDOA of a transmitter is calculated between at least two known receivers. This is possible if one knows the position and velocity of the at least two known receivers, as a function of time, with respect to the potential transmitter's path. Accordingly, embodiments of the invention determine the TDOA and FDOA between the receivers that would occur if the receivers were receiving a signal from the potential transmitter.

As is set forth above, however, at this point it is not known that a signal is actually originating from the selected candidate transmitter. The calculated TDOA and FDOA are the TDOA and FDOA that would result from a signal from the selected candidate transmitter at the receivers. The waveforms of the signals actually received by the receivers, however, represents an amalgam of all of the signals within receiving range, only some of which or none of which actually originate from the selected candidate transmitter.

In order to determine whether a signal is actually originating from the selected candidate transmitter, according to certain embodiments, a cross-correlation is performed between the two receivers. Cross-correlation is a method used to determine similarity between two waveforms. In embodiments of the invention, the received signal at one receiver is time shifted in an amount equal to the calculated TDOA that would result if a signal was originating from a selected candidate transmitter. The time shifted signal is then subject to a frequency offset to remove the Doppler shift that would be introduced by transmitter and receiver motion if the signal was originating from a selected candidate transmitter. In this way, the calculated FDOA between the receivers that would occur from a signal originating from a selected candidate transmitter is used to subject the time shifted signal to a frequency offset. By time shifting and frequency shifting one of the received signals, any signal originating from the selected candidate transmitter becomes co-aligned in both time and frequency at the receivers. By cross-correlating the received signals and integrating the resultant signal over time, a strong peak emerges if there was in fact a signal originating at the selected candidate transmitter. The other signals received by the receivers remain randomly aligned with respect to one another, and so "wash out" during the integration process. This allows for the identification of a signal originating at the candidate transmitter (or more accurately, originating along the path of the candidate transmitter) on the basis of calculated TDOA and FDOA, if such a signal exists. If no strong cross-correlation peak emerges, the conclusion is that there is no source of signals along the path of the candidate transmitter, and a new candidate transmitter is selected, and the process repeated.

Figure 3B:
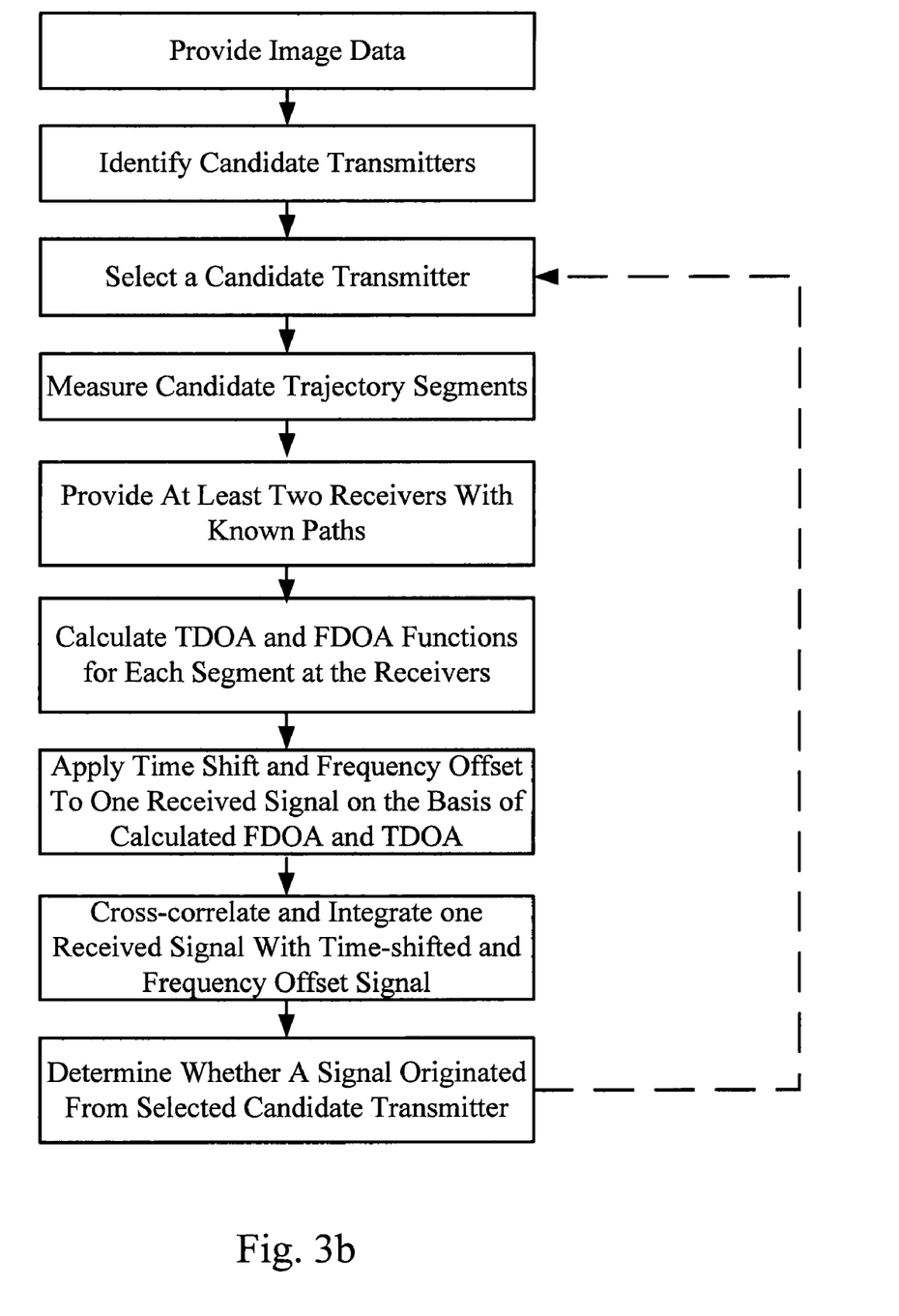
FIG. 3b is a flowchart showing a method of correlating known image data of moving transmitters with measured radio signals according to an embodiment of the invention.

These steps are shown generally at FIG. 3b, which is a flow chart showing an iterative method of identifying candidate transmitters according to a method of the invention.

It is important to note that the methods set forth above with respect to FIGS. 3a and 3b need not be performed in real time. Various non-illustrated data storage steps may be implemented within the spirit of the instant invention. For example, image data showing vehicle paths as a function of time may be stored. Additionally, the paths of the receivers as a function of time may be stored. Additionally, data showing the received radio signals by the receivers may be stored. Correlation analysis may then be performed on the basis of the stored data at any point in the future by analyzing the stored data.

A variety of systems and methods are used according to embodiments of the invention to correlate measured TDOA/FDOA data to the data computed from the image data. For example, in one embodiment, the computed TDOA and FDOA for the candidate trajectory segments are used to form discrete filters with corresponding delay/phase vs. time characteristics. The receivers measure transmitted signals of interest, which are applied to the segment filters, for example, by the cross-correlator described below with respect to FIG. 4. The application of the segment filters to the measured signals allows for the association of particular path segments with particular signals. In this way the paths of source candidates, i.e., vehicles, are associated with measured signals from these candidates.

Figure 4:
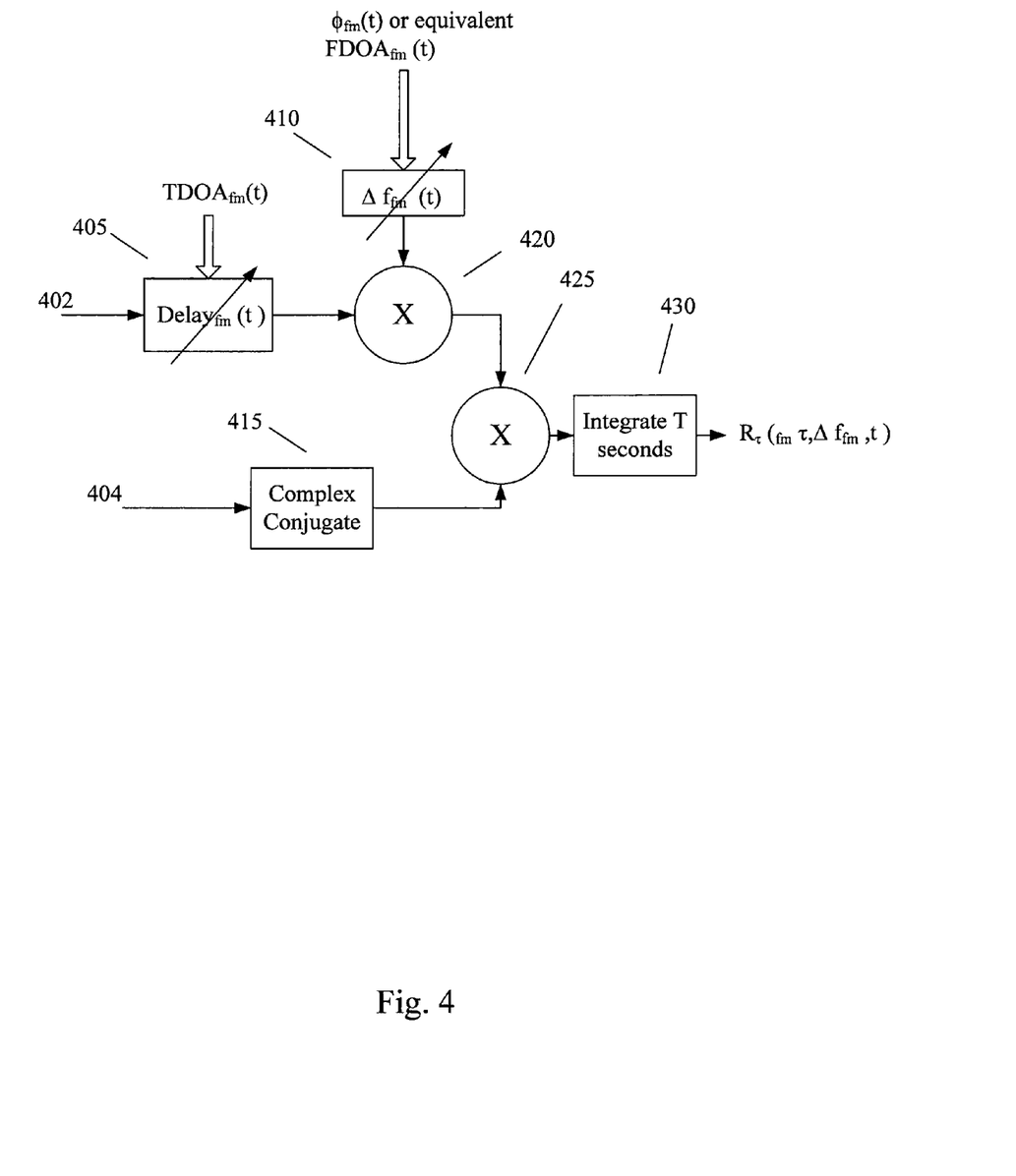
FIG. 4 is a schematic diagram of a cross-correlation filter matched to a specific moving transmitter according to an embodiment of the invention.

A cross-correlation filter matched to a specific moving transmitter is illustrated in FIG. 4. The cross-correlator of FIG. 4 includes two signal inputs, 402 and 404 which are the measured signals from two receivers having known positions. Alternatively, inputs 402 and 404 may be the sum or difference frequency signals from two receivers, i.e., the raw received signals after they have been further modulated by oscillators in the respective receivers. The signal on 402 is passed to a delay element 405 that adds a time delay to the signal on input 402. The among of the delay introduced by the delay element 405 is determined by the calculated TDOA that would occur between the receivers for a signal originating from a path segment of a given chosen transmitter candidate. If the received signals are actually from chosen transmitter candidate, the result is synchronization between the signals on inputs a and b to an accuracy of better than 1/bandwidth of each receiver. Although TDOA as a function of time is known since it is measured directly by the two receivers, it is often convenient to hold the delay constant over a processing interval, and then to step the delay in order simplify processing at the cross-correlator and subsequent steps.

At the same time, the frequency offset between legs of the cross-correlator is adjusted by a frequency offset element (or equivalent) 410 to compensate for the FDOA of the target location. In FIG. 4, a phase vs. time adjustment is shown, but FDOA equals the rate of phase adjustment. Again, the amount of frequency offset is determined from the calculated FDOA that would occur between the receivers for a signal originating from a path segment of a given chosen transmitter candidate. The frequency offset is applied to the time-shifted signal by complex multiplication with computational element 420.

A computational element 415 converts the signal on input 404 to its complex conjugate. The two signals are then complex multiplied together by another computational element 425 resulting in a cross-correlation between the two signals. The resultant complex multiplied signal is then integrated over an averaging time T by another computational element 430, and the Magnitude and Phase of the complex cross-correlation at offset TDOA and FDOA is computed. A fixed signal coming from the targeted location will have a complex phase that does not change with time, while a signal with a different FDOA will have a changing phase with time and a signal with a TDOA offset larger than 1/bandwidth or an FDOA offset larger than 1/T will be significantly reduced in amplitude. If this process is repeated for many different locations, i.e., many different candidate trajectory segments (many different TDOAs and FDOAs vs. time) an association can be established between candidate trajectory segments and signals.

The various computational elements pictured in FIG. 4 may be realized as hardware components, firmware components or software instructions encoded onto a computer-readable medium, such as a hard disk drive or an optical disk.

It is important to note that if the trajectory segments are precise, the signal processing required to form matched filters to process every possible segment may be much less than the effort required to search the target area for signals from fixed transmitters whose location is unknown. This is because there are fewer moving vehicles in a scene than the total number of fixed resolution cells required to cover the viewable area.

Additionally, if the trajectory segments have uncertainties due to imagery measurement error, one might use a multidimensional search over the region of the uncertainties much like the radar problem described early. The dimensionality of this search would be very constrained by the prior knowledge from measurements on the imagery and by physical motion constraints. Note only might there be physical constraints on accelerations, jerk, etc. but one might constrain motion to follow road lanes, etc.

The possibility exists that a signal may be detected in a filter that matches to several vehicles in an image. This is especially true if relatively short integration time is used in the initial detection step. So several cars traveling in adjacent lanes at the same speed might have very similar TDOA-FDOA vs. time profiles for 10 seconds or so. With a likely raw position vs. time accuracy worse than a wavelength, the vehicles might not separate to a measurable degree in phase vs. time trajectory space until braking for a stoplight or changing lanes.

However, it is very unlikely that signals will be simultaneously transmitted from such closely spaced vehicles. If only one signal is present in a resolution cell, it is possible to measure the cross-correlation's differential phase vs. time to establish an extremely accurate measurement of position change vs. time. This measurement could be of the phase of FIG. 4's cross-correlation output, R. This is a matter of position accuracy, not resolution. Once the relative position of two vehicles in imagery is detected to change, the measured phase difference vs. time can be used to discriminate one vehicle from the other.

As is set forth above, buildings, trees, etc may occasionally obscure the imagery. If the obscuration is long enough, the accuracy of the image track before and after the obscuration may not be good enough to unambiguously associate track segments. Availability of differential phase measurements may dramatically improve the situation, however.

Suppose that a vehicle has been unambiguously associated with a radio signal and then the vehicle is lost from view for 20 seconds. After this time, two vehicles emerge from obscuration, but the location of both match to within the imagery trajectory uncertainty. Because the FDOA measurement accuracies on the signal may be much better than the imagery velocity measurement, one may be able to associate the two segments based only on a precise velocity going into and coming out of obscuration and an assumption about acceleration while obscured. Lacking that, one continues to observe the new segments until one can be proven to match the radio signal. Then the association of radio signal to track segments is again established, and consequently the association between the before and after segments.

Although in the example set forth in FIGS. 3a, 3b and 4 above show the use of TDOA and FDOA to track transmitters, measuring phase as a function of time is an acceptable substitute for either or both of these measurements. Additionally, although the examples set forth in FIGS. 3a, 3b and 4 show the use of both TDOA and FDOA to track transmitters, embodiments of the invention can locate and track transmitters with only one type of measurement.

Figure 5:
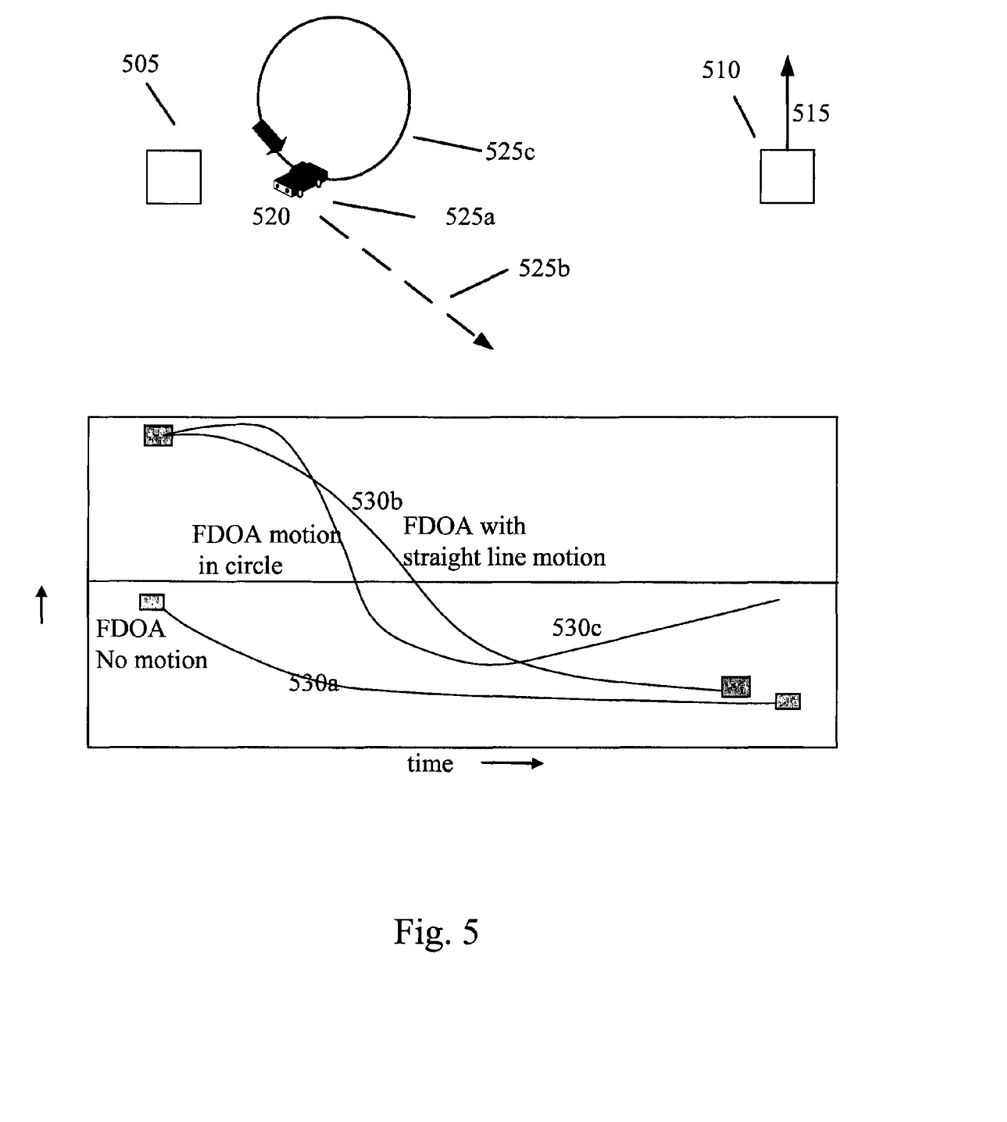
FIG. 5 is an illustration of using only FDOA to discriminate among different moving transmitters according to an embodiment of the invention.

FIG. 5 shows an FDOA measurement geometry with a stationary receiver 505, a receiver 510 moving along velocity vector 515 and a vehicle 520. Vehicle 520 can take one of three paths, each of which is associated with a uniquely shaped curve in measured FDOA vs. time space. In a first path, vehicle 520 remains motionless, denoted by 525a. In a second path, vehicle 520 proceeds in a straight line 525b. In a third path, vehicle 520 moves in a circular path 525c. A plot of FDOA vs. time for all three paths shows three unique curves, which can be used to identify the type of motion experienced by vehicle 520. 530*a* shows the FDOA vs. time curve for stationary motion; 530*b* shows the FDOA vs. time curve for motion in a straight line, and 530*c* shows FDOA vs. time for circular motion.

It is assumed that the signal is narrowband so only FDOA measurements are available. Although sizable FDOA shifts are illustrated in the figure, applying a differential phase measurement could separate motion differing by only a few wavelengths.

In the FDOA vs. time plots of FIG. 5, the stationary path's curve starts off at a slightly negative FDOA since it is slightly to the rear of receiver 510's motion vector. As receiver 510 continues to move, the stationary receiver is further behind the receiver's velocity vector and the Doppler shift is more negative as shown by the line with the blue starting and ending points. The path that moves in a straight line starts off with a positive FDOA due to motion toward receiver 510 and away from receiver 505. This is added to the FDOA corresponding to the initial fixed location. As the transmitter moves past receiver 510 the transmitter is moving away from receiver 510 and the FDOA shifts negative.

Finally, the vehicle moving in a circle begins with the same velocity vector as the straight-line vehicle above, so the initial FDOAs are identical. As the vehicle turns left towards receiver 510 there is a slight positive FDOA shift that is followed immediately by a rapid negative FDOA shift when the vehicle turns away from receiver 510 and then followed by a slight positive shift as it starts a turn back toward receiver 510. If the vehicle continues to drive in a circle, the FDOA vs. time will eventually become periodic.

FIG. 5 shows that very simple measurements may be sufficient to discriminate between multiple vehicles. For example, measuring Doppler vs. time using a single receiver will eventually uniquely identify individual vehicles in an image even with when transmitter frequency bias and slow frequency drift contaminate the measurements. This is because not all vehicles will brake to a stop, turn, etc. at the same time, and such large motion effects should be easily observed.

On the other hand, extremely precise measurements such as phase-difference between separated receivers may be useful to separate several vehicles traveling as a group along a straight highway.

Although in the example of FIG. 5, the use of two receivers using FDOA to determine information about the path of a moving transmitter, in some cases useful information about a moving transmitter's path may be determined using only a single receiver. For example, suppose that there is a moving transmitter broadcasting a signal with some known characteristics, e.g, known frequency characteristics. Suppose further that a single receiver is provided, which is either stationary or moving along a known path with a known velocity as a function of time. Given the known motion of the receiver, image data of potential transmitters can be used to calculate the Doppler shift (i.e., frequency offset) of any signal sent by any of the potential transmitters at the receiver as a function of time. If the frequency characteristics of a signal of interest are known, this calculated Doppler shift can be used to determine which transmitter was the source of the received signal.

While one or more embodiments of the present invention have been illustrated in detail, the skilled artisan will appreciate that modifications and adaptations to those embodiments may be made without department from the scope of the present invention as set forth in the following claims.

The invention claimed is:

1. A method of correlating potential transmitters with received radio signals comprising:
   providing image data including paths traveled by potential transmitters;
   identifying potential transmitters within the image data;
   identifying path segments traveled by the potential transmitters;
   providing at least a first and second receiver of radio signals;
   calculating at least one of the following parameters: time difference of arrival, phase difference of arrival and frequency difference of arrival, of radio signals broadcast from the identified path segments to the first and the second receivers;
   receiving radio signals from potential transmitters at the first and second receivers;
   measuring at least one of the following parameters: time difference of arrival, phase difference of arrival and frequency difference of arrival, for the received radio signals;
   comparing the at least one measured parameter with the at least one calculated parameter; and
   associating received radio signals with identified path segments on the basis of said comparison.

2. The method of claim 1, wherein the calculating step includes calculating time difference of arrival and frequency difference of arrival of radio signals broadcast from the identified path segments to the first and the second receivers.

3. The method of claim 2, wherein the measuring step includes measuring time difference of arrival and frequency difference of arrival of the received radio signals.

4. The method of claim 1 wherein the comparing step comprises:
   establishing discrete filters with delay and phase versus time characteristics for each of said identified path segments; and
   applying said discrete filters to said calculated time difference of arrival and frequency difference of arrival for said received radio signals.

5. The method of claim 4, wherein said step of establishing discrete filters comprises:
   providing a first input signal from said first receiver of radio signals;
   providing a second input signal from said second receiver of radio signals;
   applying a time delay to said first input signal on the basis of a calculated time difference of arrival of radio signals broadcast from the identified path segments to the first and the second receivers;
   applying a frequency offset to said first input signal on the basis of a calculated frequency difference of arrival of radio signals broadcast from the identified path segments to the first and second radio receivers;
   taking the complex conjugate of said second input signal;
   complex multiplying the complex conjugate of said second input signal and the time delayed and frequency offset first input signal; and
   integrating over time the signal resulting from the complex multiplication.

6. The method of claim 1, wherein
comparing the at least one measured parameter with the at least one calculated parameter comprises:
   generating a plot of calculated time difference of arrival and frequency difference of arrival for candidate transmitters in FDOA/TDOA space;

generating a plot of measured time difference of arrival and frequency difference of arrival in FDOA/TDOA space; and overlaying said plot of calculated FDOA and TDOA and said plot of measured FDOA and TDOA.

7. The method of claim 1, wherein one of said first and second receivers is in motion.

8. The method of claim 1, wherein both of said first and second receivers are in motion.

9. A method of associating received radio signals with potential transmitters, comprising:
   providing image data showing candidate transmitters;
   identifying candidate transmitters;
   selecting a first candidate transmitter;
   measuring the selected first candidate transmitter's trajectory segments;
   providing at least two receivers having known paths resulting in a first received signal and a second received signal;
   calculating at least one of the following parameters based on the measured trajectory segments of the first candidate transmitter: time difference of arrival, frequency difference of arrival, and phase difference of arrival;
   applying a time shift to the first received signal resulting in a time-shifted signal;
   cross-correlating the second received signal with the time shifted signal; and
   integrating the function resulting from the cross-correlation over time.

10. The method of claim 9, wherein the time shift applied to the first received signal is calculated on the basis of a measurement of time difference of arrival at said first and second receivers.

11. The method of claim 9, further comprising;
   applying a frequency offset to said time-shifted signal prior to cross-correlation.

12. The method of claim 11, wherein the frequency offset applied to the first received signal is calculated on the basis of a measurement of frequency difference of arrival at said first and second receivers.

13. The method of claim 9, wherein at least one of said first and second receivers is in motion.

14. The method of claim 9 further comprising selecting a second candidate transmitter.

15. A method of identifying a source of signals comprising:
   providing image data showing a plurality of moving candidate transmitters;
   providing a first receiver adapted to receive radio signals from said plurality of moving candidate transmitters;
   calculating a Doppler shift as a function of time for received radio signals for each of said plurality of moving candidate transmitters;
   comparing said calculated Doppler shift with received signals having known frequency characteristics.

16. The method of claim 15, wherein providing image data showing a plurality of moving candidate transmitters comprises provided image data showing a motion paths taken by at least one of said plurality of moving candidate transmitters.

17. A method of identifying a source of signals comprising:
   providing data representing the time-varying position of moving candidate transmitters;
   providing a first receiver adapted to receive radio signals from said plurality of moving candidate transmitters;
   calculating a Doppler shift as a function of time for received radio signals for each of said plurality of moving candidate transmitters;
   comparing said calculated Doppler shift with received signals having known frequency characteristics.

* * * * *